United States Patent
Kaushik et al.

(10) Patent No.: US 9,686,215 B2
(45) Date of Patent: Jun. 20, 2017

(54) METHOD AND APPARATUS FOR AUTOMATICALLY AGGREGATING METADATA AND E-MAIL ATTACHMENTS FROM VARIOUS E-MAIL PROVIDERS IN A CLOUD REPOSITORY

(71) Applicant: Adobe Systems Incorporated, San Jose, CA (US)

(72) Inventors: Nishant Kaushik, Jhajjar (IN); Yash Kumar Gupta, Agra (IN); Rajeev Sharma, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 14/041,360

(22) Filed: Sep. 30, 2013

(65) Prior Publication Data

US 2015/0095430 A1    Apr. 2, 2015

(51) Int. Cl.
*H04L 12/58* (2006.01)
*G06Q 10/10* (2012.01)
*G06F 17/30* (2006.01)

(52) U.S. Cl.
CPC ........ *H04L 51/08* (2013.01); *G06F 17/30286* (2013.01); *G06Q 10/101* (2013.01)

(58) Field of Classification Search
CPC ....... G06F 1/00; G06F 17/30286; H04L 1/00; H04L 51/08; G06Q 10/00; G06Q 10/101
USPC ........ 709/201, 204, 208, 212, 213, 220, 206
See application file for complete search history.

(56) References Cited

U.S. PATENT DOCUMENTS

| | | | |
|---|---|---|---|
| 8,914,856 B1* | 12/2014 | Velummylum | H04L 63/08 726/19 |
| 2004/0064733 A1* | 4/2004 | Gong | 713/201 |
| 2007/0150810 A1* | 6/2007 | Katz et al. | 715/526 |
| 2007/0239506 A1* | 10/2007 | Jania et al. | 705/8 |
| 2008/0109448 A1* | 5/2008 | Aboel-Nil | G06Q 10/107 |
| 2009/0187852 A1* | 7/2009 | Tsuruta | 715/800 |
| 2010/0082713 A1* | 4/2010 | Frid-Nielsen | G06F 17/301 707/821 |
| 2010/0082760 A1* | 4/2010 | Martino | H04L 51/08 709/206 |
| 2012/0254332 A1* | 10/2012 | Irvin | 709/206 |
| 2013/0219176 A1* | 8/2013 | Akella | H04L 63/0815 713/165 |
| 2013/0290442 A1* | 10/2013 | Dgani | G06Q 10/107 709/206 |
| 2014/0181223 A1* | 6/2014 | Homsany et al. | 709/206 |
| 2014/0297759 A1* | 10/2014 | Mody | H04L 51/08 709/206 |
| 2015/0066863 A1* | 3/2015 | Sehrer | H04N 21/4788 707/663 |

* cited by examiner

*Primary Examiner* — Abdulkader M Alriyashi
(74) *Attorney, Agent, or Firm* — Keller Jolley Preece

(57) ABSTRACT

A computer implemented method and apparatus for automatically aggregating metadata and e-mail attachments from various e-mail providers in a cloud repository. The method comprises accessing account information for one or more related e-mail accounts; accessing one or more e-mails from the one or more e-mail accounts using the received account information, wherein the one or more e-mails comprise one or more documents as one or more attachments; extracting metadata from each e-mail in the one or more e-mails that comprises at least one attachment, wherein the metadata comprises information that identifies the attachment and an associated e-mail; and storing the metadata in a cloud repository.

20 Claims, 5 Drawing Sheets

METHOD AND APPARATUS FOR AUTOMATICALLY AGGREGATING METADATA AND E-MAIL ATTACHMENTS FROM VARIOUS E-MAIL PROVIDERS IN A CLOUD REPOSITORY

BACKGROUND OF THE INVENTION

Field of the Invention

Embodiments of the present invention generally relate to document storage and, more particularly, to a method and apparatus for automatically aggregating metadata and e-mail attachments from various e-mail providers in a cloud repository.

Description of the Related Art

Due to the presence of so many document storage solutions, a user's documents are generally stored in several locations, such as on home and office computers, mobile devices, and some are distributed in the user's accounts with various repositories in the cloud. A challenge of any cloud based document repository is how to automatically bring in a user's documents from all of their sources, and store them in a single location such that they can be managed, tracked, searched and worked with easily.

Most of a user's documents are exchanged via e-mail at some time. However, acquiring documents and moving them to a cloud-based repository from an e-mail account is a cumbersome manual process, requiring a user to explicitly download e-mail attachments and upload them to the cloud-based repository. Further, this must be done on every kind of device or system where a personal document management solution is to work. This creates a poor user experience.

Therefore, there is a need for a method and apparatus for aggregating metadata and e-mail attachments from various e-mail providers in a cloud repository.

SUMMARY OF THE INVENTION

A method and apparatus for aggregating metadata and e-mail attachments from various e-mail providers in a cloud repository substantially as shown in and/or described in connection with at least one of the figures, as set forth more completely in the claims. The method accesses account information for one or more of a user's e-mail accounts. Using the account information, the method accesses one or more e-mails from the one or more e-mail accounts, wherein the one or more e-mails comprise an attachment. Metadata is extracted from each e-mail that includes an attachment, wherein the metadata comprises information that identifies the attachment and associated e-mail. The metadata is then stored in a cloud repository.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1:
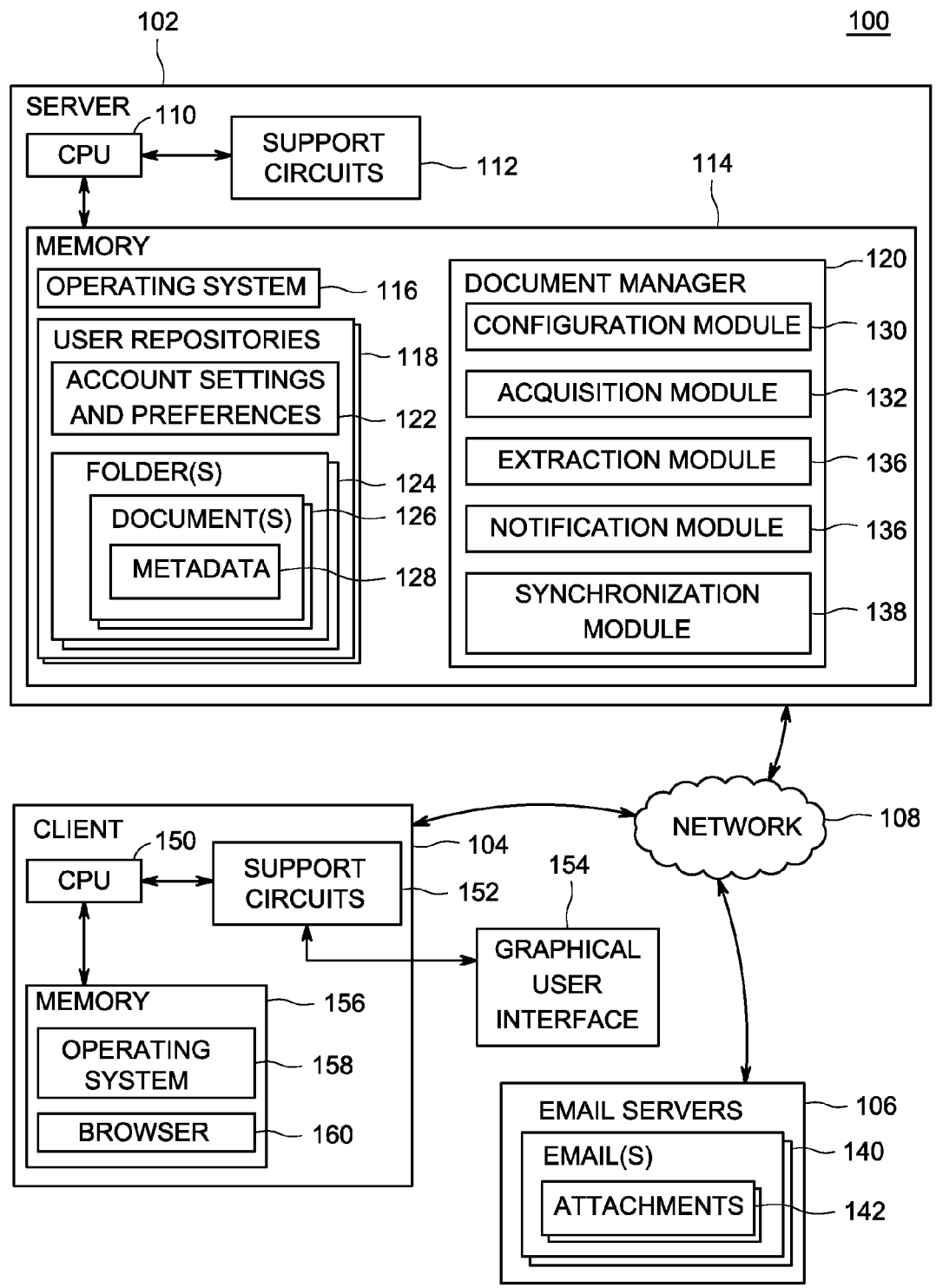
FIG. 1 is a block diagram of a system for automatically aggregating metadata and e-mail attachments from various e-mail providers in a cloud repository, according to one or more embodiments.

While the method and apparatus is described herein by way of example for several embodiments and illustrative drawings, those skilled in the art will recognize that the method and apparatus for automatically aggregating metadata and e-mail attachments from various e-mail providers in a cloud repository is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for automatically aggregating metadata and e-mail attachments from various e-mail providers in a cloud repository defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus for automatically aggregating metadata and e-mail attachments from various e-mail providers in a cloud repository. The embodiments receive e-mail information for one or more e-mail accounts from which attachments are to be stored. Using the account information, each e-mail account is accessed. For each e-mail with an attachment, metadata is extracted about the attachment. The metadata may include the document name, the type of document (e.g., media file, PDF, etc.), the sender, other recipients, the subject line of the e-mail, the date, the content of the e-mail, reminders, follow-ups, and the like. The embodiments store the metadata in a cloud repository.

When a user accesses the repository, they may select, via a graphical user interface, a document that he or she would like to view, share, or edit. The graphical user interface displays information about each document, wherein the information is retrieved from the metadata for the document. Until this point, only the metadata for the document is stored in the folder. When a user opens or shares the document, the document is pulled from the e-mail server and stored in the repository. When the user shares or updates a document, a personalized e-mail notification is automatically generated and sent to the sender and other recipients of the original e-mail, notifying them that the document has been updated. The e-mail notification may be sent when the user updates the document or when any action is taken on the document (e.g., 'agree' to a comment in the document, adding a new recipient in a shared document). The e-mail is sent using the e-mail address of the user as the sender of the e-mail notification.

The document metadata is periodically synced with the e-mail servers. Because a document is only stored in the repository when the document is opened or shared by the user, metadata may exist in the repository for a document that was attached to the e-mail, never opened, and the e-mail has since been deleted. The embodiments determine whether the e-mail from which the metadata was extracted still exists. If the e-mail was deleted, the metadata is deleted from the repository. If a user tries to access a document before the repository has discovered its deletion, document acquisition fails and an appropriate error message is displayed to the user.

In some embodiments, reminders may be sent to the user in the event that an e-mail includes a calendar event. For example, an e-mail message may include a document that is attached to a meeting invite. Alternatively, an e-mail may contain date information, such as a due date, that may trigger a reminder. For example, the e-mail content may read, "review and forward to John Smith by Monday". A reminder message may be automatically sent to the user to review a document per the calendar event.

Advantageously, managers of a cloud-based repository, such as ADOBE Systems, Incorporated, can provide a seamless user experience to customers seeking a way to automatically store their documents in a central location. Metadata that identifies a document in an e-mail attachment is stored in the cloud. When a user chooses to interact with the document, the document is automatically uploaded to the repository where it is sorted and stored for easy retrieval. Further, relevant information, such as sender, date, and e-mail message content is maintained with the document. In addition, when the document is modified, an automatic notification is sent from the user's own e-mail account.

As used herein, an e-mail attachment is a computer file sent along with an e-mail message. A document is electronic content present as an attachment to an e-mail or embedded in the e-mail. For example, the document is present as an attachment in the Hyper Text Markup Language (HTML) format of the email while the document is embedded in the email as Rich text format of the e-mail. Examples of the document include, but are not limited to an image file, text file, word processing file, video file, and the like. Metadata is information about an e-mail and an attachment of the e-mail. The metadata describes the content of the e-mail and the attachment in a manner that enables identification of the e-mail and the attachment of the e-mail. A document repository is a computer system (or set of computer programs) used to track and store electronic documents. A cloud repository is a document repository in the cloud. In a cloud repository, electronic documents are stored in virtualized pools of storage typically hosted by third parties, but may be accessed by the owner, or user of the electronic documents.

Various embodiments of a method and apparatus for automatically aggregating metadata and e-mail attachments from various e-mail providers in a cloud repository are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for automatically aggregating metadata and e-mail attachments from various e-mail providers in a cloud repository, according to one or more embodiments. The system 100 includes a cloud server 102, hereafter referred to as the server 102, a client 104, a plurality of e-mail servers 106, communicatively connected via a network 108. The server 102 is an electronic or a computing device, for providing computing services in the cloud. Examples of the server 102 include, but are not limited to a blade server, a virtual server, and the like. In one embodiment, the server 102 is a cloud repository, such as ADOBE® Document Cloud. The server 102 includes a Central Processing Unit (CPU) 110, support circuits 112, and a memory 114. The CPU 110 may include one or more commercially available microprocessors or microcontrollers that facilitate data processing and storage. The various support circuits 112 facilitate the operation of the CPU 110 and include one or more clock circuits, power supplies, cache, input/output circuits, and the like. The memory 114 includes at least one of Read Only Memory (ROM), Random Access Memory (RAM), disk drive storage, optical storage, removable storage and/or the like.

The memory 114 includes an operating system 116, a plurality of user repositories 118, and a document manager 120. The operating system 116 may include various commercially known operating systems. The user repository 118 includes a file of account settings and preferences 122, and a plurality of folders 124, wherein a folder exists for each document source, for example, OUTLOOK®, GMAIL®, and DROPBOX®. Each folder 124 includes metadata 128 and may include one or more documents 126 as well. The document manager 120 includes a configuration module 130, an acquisition module 132, an extraction module 134, a notification module 136, and a synchronization module 138.

The client 104 is a type of computing device, such as a desktop computer, a laptop, a tablet computer, a Smartphone, and the like. The client 104 includes a Central Processing Unit (CPU) 150, support circuits 152, a graphical user interface (GUI) 154, and a memory 156. The CPU 150 may include one or more commercially available microprocessors or microcontrollers that facilitate data processing and storage. The various support circuits 152 facilitate the operation of the CPU 150 and include one or more clock circuits, power supplies, cache, input/output circuits, and the like. The memory 156 includes at least one of Read Only Memory (ROM), Random Access Memory (RAM), disk drive storage, optical storage, removable storage and/or the like.

The memory 156 includes an operating system 158 and a browser 160, which is used to access the metadata 128 and documents 126 on the server 102. The operating system 158 may include various commercially known operating systems.

The e-mail servers 106 include e-mails 140. One or more of the e-mails 140 includes one or more attachments 142.

The network 108 includes a communication system that connects computers (or devices) by wire, cable, fiber optic and/or wireless link facilitated by various types of well-known network elements, such as hubs, switches, routers, and the like. The network 108 may be a part of the Intranet using various communications infrastructure, such as Ethernet, Wi-Fi, a personal area network (PAN), a wireless PAN, Bluetooth, Near field communication, and the like.

Upon accessing the document manager 120 via the browser 160 on the client 104, the configuration module 130 prompts a user to provide e-mail account settings, such as an e-mail address, a password, and/or an SMTP server, and/or an IMAP server, and/or POP3 server, or any settings that are needed to access the user's e-mail accounts. For example, a user may have an OUTLOOK account, a GMAIL account, a DROPBOX account, and a CREATIVE CLOUD account. Although not all document storage accounts are email accounts, all accounts include an associated e-mail for communication. As such all document storages accounts are herein referred to as e-mail accounts. The configuration module 130 also prompts the user for preferences, for example, to specify a maximum number of documents to store, a maximum time to store the documents, a date after which documents are to be retrieved, and the like. The configuration module 130 stores the e-mail settings and user preferences in account settings and preferences 122.

The acquisition module 132 then connects to the e-mail servers 106 associated with the provided e-mail accounts and queries for e-mails 140 with document attachments 142. In some embodiments, the acquisition module 132 also queries for calendar entries and the like. The extraction module 134 accesses e-mails 140 that include attachments 142 and extracts information (i.e., metadata) from the e-mail 140 and the attachments 142 and copies them to an appropriate folder 124 based on the e-mail server 106 from which the document 126 was retrieved. In some embodiments, the extraction module 134 also copies the document 126 to the appropriate folder 124. The extraction module 134 also extracts information about the e-mail 140 and the attachment 142 and stores the information in metadata 128 with the document 126. Metadata 128 may include the document name, the type of document (e.g., media file, PDF, etc.), the sender, other recipients, the subject line of the e-mail, the date of the e-mail, the content (message) of the e-mail, and the like.

A user may access the user repository 118 via the browser 160. The folders 124 are displayed to the user via the graphical user interface 154. Using the graphical user interface 154, the user may select a folder 124 and further select a document 126. In some embodiments, although the documents 126 are listed in the folders 124, until a user opens or shares the document 126, only the metadata 128 exists in the user repository 118. When a document 126 is selected for the first time, the acquisition module 132 retrieves the e-mail 140 from the e-mail server 106 and the extraction module 134 copies the attachment 142 into a folder 124 and stores it as document 126. If the document 126 has already been stored in the repository, the document manager 120 opens the document 126 for use by the user. When a user makes changes to the document 126, whether by editing, taking action, such as accepting changes, adding a recipient with whom to share the document 126, or any modification, the notification module 136 automatically formats and sends a notification e-mail to all recipients and the original sender of the e-mail that had the document as an attachment, notifying them that the document 126 has been modified. The notification e-mail is sent using the user's own e-mail account.

The notification module 136 may also send reminder e-mails to the user when for example, metadata 128 includes a meeting invite or other calendar event. The notification module 136 automatically sends an e-mail to the user reminding the user to review the document 126 that is associated with the metadata 128 that includes the calendar event.

The synchronization module 138, at pre-defined intervals, for example, daily or weekly, accesses a user's e-mail servers 106 and acquires metadata from e-mails with attachments that have arrived since a previous synchronization occurred. In addition, the synchronization module 138 at pre-defined intervals, for example, daily or weekly, accesses the user repository 118. For any metadata 128 in which the associated document 126 has not been stored in the user repository 118, the synchronization module 138 directs the acquisition module 132 to attempt to access the e-mail 140 on the e-mail server 106 and determine whether the e-mail 140 exists or has been deleted. If the e-mail 140 from which the metadata 128 exists has been deleted, the synchronization module 138 deletes the metadata 128 from the user repository 118. If the user tries to access the document 126 before the synchronization module 138 has discovered its deletion, document acquisition fails and an appropriate error message is displayed to the user via the graphical user interface 154.

Figure 2:
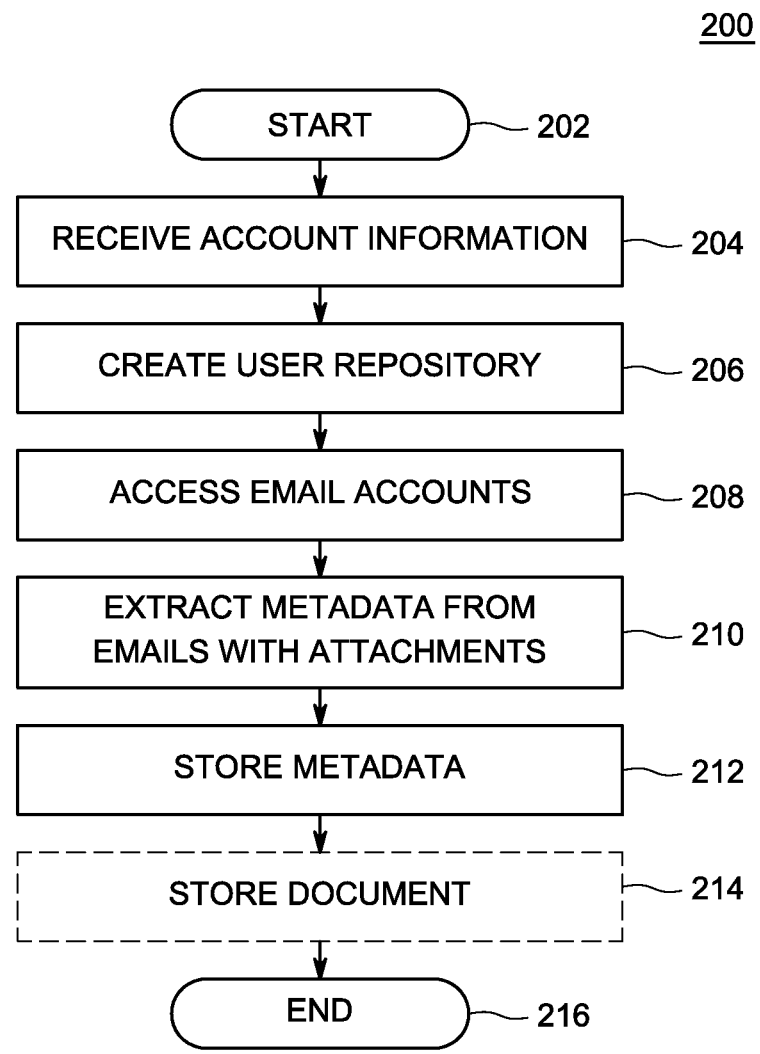
FIG. 2 depicts a flow diagram of a method for configuring a user repository as performed by the configuration module of FIG. 1, according to one or more embodiments.

FIG. 2 depicts a flow diagram of a method 200 for configuring a user repository as performed by the configuration module 130 of FIG. 1, according to one or more embodiments. The method 200 accesses e-mail settings and preferences for all of the accounts from which documents are to be stored. The method 200 then retrieves the documents from the accounts and stores them in a user repository. The method 200 is initially performed when a user wants to consolidate documents from different e-mail accounts in the repository and may be performed when the user wishes to add or delete e-mail accounts. The method 200 starts at step 202 and proceeds to step 204.

At step 204, the method 200 accesses account information. When a user logs into a document repository for the first time and requests to set up a repository, the user is prompted to provide e-mails setting for each account from which the user would like to have documents stored. The setting may include an e-mail address, password, SMTP server, IMAP server, POP3 server, and the like. In some embodiments, the user is also prompted to provide preferences for each e-mail account. For example, the user may specify a maximum number of documents to store from each account, a date or length of time, such that only documents after the date are stored or documents are only stored for a specified period of time, and the like. The method 200 accesses this account information and proceeds to step 206.

At step 206, the method 200 creates the user repository. The user repository is a hierarchical structure. The user repository includes a folder for each user who stores documents in the repository. The method 200 creates a sub-folder inside the main folder of the user for each e-mail account. The method 200 proceeds to step 208, where the method 200 accesses each e-mail account using the account setting provided in step 204.

The method 200 proceeds to step 210, where the method 200 extracts metadata from e-mails that include attachments. For each e-mail that includes an attachment, the method 200 extracts information regarding the attachment as well as the e-mail itself. Information may include a document name, a type of document (e.g., media file, PDF, etc.), a sender, one or more other recipients, a subject line of the e-mail, a date of the e-mail, content including the message body of the e-mail, and the like. The method 200 may extract calendar information from the e-mail content. For example, the e-mail may include a meeting invite, or a message within the content that specifies a calendar event, such as a due date.

The method 200 proceeds to step 212, where the method 200 stores the extracted information as metadata. The metadata is stored as file metadata of an attachment file in the appropriate folder. For example, if the e-mail is from an OUTLOOK account, the metadata is stored in the repository in the folder for OUTLOOK e-mails. Sample metadata for an e-mail attachment may be stored as JavaScript Object Notation (JSON) as follows:

```
{
    'name': 'documentName.pdf',
    'size': 237568,
    'sender': 'johnsmithk@adobe.com',
    'subject': 'Sample E-mail Message ',
    'message_date': 'Mon 09-09-2013 18:06',
    'recipient': 'whitepigeonnew@gmail.com',
    'content_type': 'application/pdf',
    'message_content': 'This e-mail contains
    a sample E-mail message, that should be
    visible to the user. Thanks,John Smith K'
}
```

The method 200 optionally proceeds to step 214 where the document is copied from the e-mail and is also stored in the repository along with the metadata. In other embodiments, the document is not copied and stored until the document is first requested by the user as described in further detail in FIG. 3 below.

Upon completion of method 200, the user repository includes a folder for each e-mail account of the user and each folder includes metadata for each e-mail attachment in the user's e-mail account from the e-mail server. The method 200 proceeds to step 216 and ends.

Figure 3:
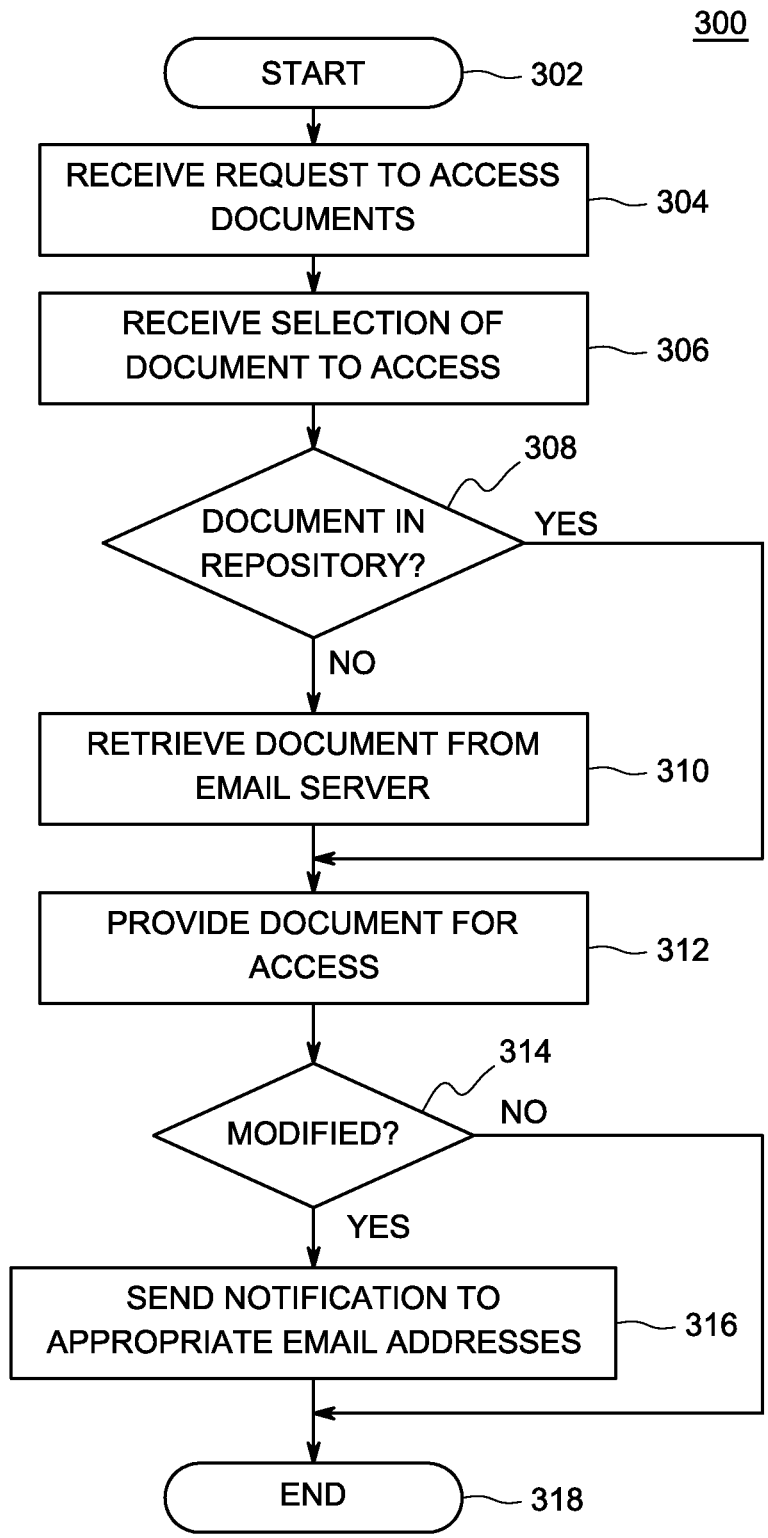
FIG. 3 depicts a flow diagram of a method for accessing documents in a user repository as performed by the document manager of FIG. 1, according to one or more embodiments.

FIG. 3 depicts a flow diagram of a method 300 for accessing documents in a user repository as performed by the document manager 120 of FIG. 1, according to one or more embodiments. The method 300 retrieves a document in response to a request to access the document. If any modifications are made to the document, a notification e-mail is sent to all original recipients and the sender of the original e-mail that had the document as an attachment. The method 300 starts at step 302 and proceeds to step 304.

At step 304, the method 300 receives a user request to access documents. When a user logs into their user repository to view their documents, the documents are presented with a list of folders that may include a list of documents for which metadata exists. The information presented to the user in the list of documents is retrieved from the metadata. The information may include the document name, the date of the e-mail to which the document was attached, the original sender, and the like. The listing may be in accordance with the user's preferences. For example, the user may have specified to show the first ten documents from a specific e-mail account. If more than ten documents exist, an option to see additional documents is presented to the user.

The method 300 proceeds to step 306, where the method 300 receives a selection of a document that the user wants to access. The user may double click on the document in the list, select the document and select an "open" option, or use any method to indicate a desire to access the document.

The method 300 proceeds to step 308, where the method 300 determines whether the document is already stored in the repository. In some embodiments, the document is stored with the metadata when the e-mail is originally accessed. In other embodiments, the document is not stored in the repository until a request is received to access the document. If the document is stored in the repository, the method 300 proceeds to step 312. However, if at step 308, the method 300 determines that the document is not stored in the repository, the method 300 proceeds to step 310.

At step 310, the method 300 accesses the e-mail server where the e-mail was originally received. The method 300 acquires the e-mail from the e-mail server, and copies the document from the e-mail and stores it in the repository. The method 300 proceeds to step 312.

At step 312, the method 300 provides the document for access. The document is opened for use by the user. In some embodiments, the method 300 determines whether the document is included as an attachment in one or more additional emails and if so, provides information regarding the one or more additional emails. In some embodiments, if there are one or more emails that are related to the document, based on metadata, the method 300 provides information regarding the one or more e-mails related to the document. The user may perform modifications and actions on the document. The user may modify the content of the document, accept changes made by a previous user of the document, add comments to the document, add recipients who may share the document and the like. When the user is done making modifications, which may be indicated by selecting an indicator, such as a "DONE" button on a user interface, or by saving the document, the document and any changes to the metadata are stored in the repository. For example, any changes to the recipient list, a timestamp indicated when the document was last modified, and the like are stored in the metadata.

The method 300 proceeds to step 314, where the method 300 determines whether any modifications were made to the document. If the method 300 determines that no modifications were made to the document by examining the latest modification timestamp in the metadata or by other means known in the art, the method 300 proceeds to step 318. However, if the method 300 determines that one or more modifications were made to the document, the method 300 proceeds to step 316.

At step 316, the method 300 sends a notification e-mail to the original sender and any recipients listed in the metadata. The e-mail is automatically generated. The e-mail includes a message stating that a modification was made. In some embodiments, specific information regarding the modification may be included in the e-mail. For example, the time of the modification, what additional recipients were added, and the like may be included in the body of the e-mail. The e-mail is also personalized. The signature line of the e-mail will read the user's name and the e-mail is sent with the user's own e-mail address indicated as the sender. Additionally, the user may edit the e-mail before the e-mail is sent. Thus, a user no longer must manually upload documents to a repository, and when updates are made to the documents, a personalized e-mail is sent from the user's own e-mail address. The method 300 proceeds to step 318.

At step 318, the method 300 stores the document in the folder with the document metadata. The method 300 proceeds to step 320 and ends.

Figure 4:
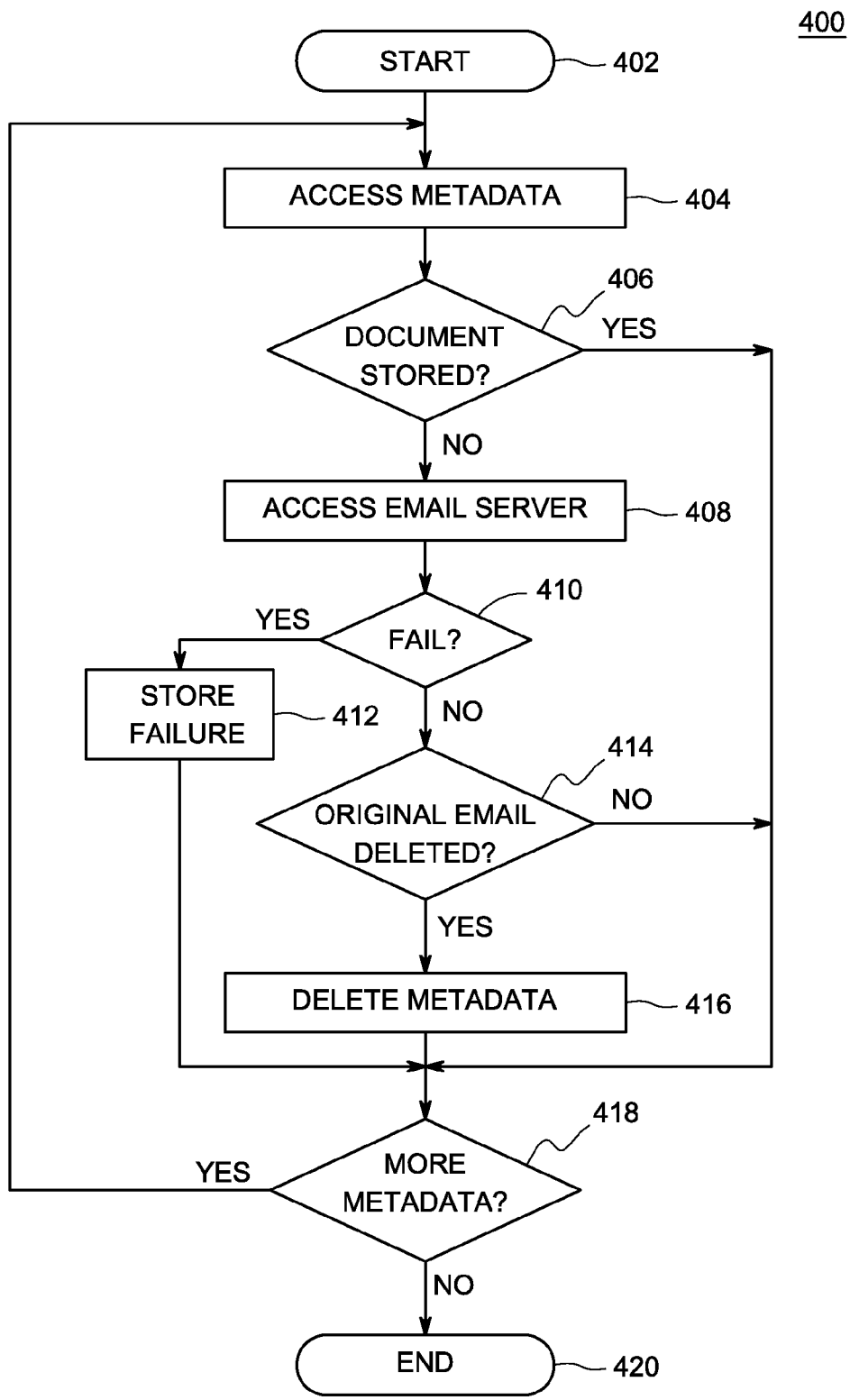
FIG. 4 depicts a flow diagram of a method for synchronizing metadata in the user repository as performed by the synchronization module of FIG. 1, according to one or more embodiments.

FIG. 4 depicts a flow diagram of a method 400 for synchronizing metadata in the user repository as performed by the synchronization module 138 of FIG. 1, according to one or more embodiments. The method 400 synchronizes metadata to ensure that a user does not attempt to access a document from an e-mail that has been deleted from an e-mail server. The method 400 executes at a predefined interval, for example, daily or weekly. The method 400 starts at step 402 and proceeds to step 404.

At step 404, the method 400 accesses metadata in the repository. The metadata represents information about an e-mail attachment. The e-mail attachment is not stored in the repository until a user attempts to access the document from the e-mail attachment, at which time the document is retrieved from the e-mail server. The method 400 proceeds to step 406, where the method 400 determines whether the document associated with the metadata is stored in the repository. If the method 400 determines that the document is stored in the repository, the method 400 proceeds to step 418. However, if at step 406, the method 400 determines that the document associated with the metadata is not stored in the repository, the method 200 must check if the e-mail that includes the document as an attachment still exists on the e-mail server. The method 400 proceeds to step 408.

At step 408, the method 400 accesses the e-mail server associated with the metadata (and the document). The method 400 uses stored account information to log into the e-mail server in order to access the e-mail. The method 400 proceeds to step 410, where the method 400 determines whether the logging into the e-mail server was successful. Logging in may fail for example, if a user changed their password at the e-mail server but failed to update their account information at the cloud repository. If the login failed, the method 400 proceeds to step 412, where the method 400 stores information about the e-mail server login failure. This information is presented to a user when the user next accesses the repository, such that the user may update their e-mail account information. The method 400 proceeds to step 418.

However, if at step 410, the method 400 determines that the login to the e-mail server was successful, the method 400 proceeds to step 414. At step 414, the method 400 determines whether the e-mail from which the metadata was extracted still exists on the e-mail server. When a user selects metadata in the cloud repository in an attempt to view the document associated with the metadata, the document, if not already stored in the cloud repository is retrieved from the e-mail server. However, if the e-mail that includes the document has been deleted, an error occurs. Hence, the method 400 ensures that the e-mail that includes the document has not been deleted. If the method 400 determines that the e-mail message still exists on the e-mail server, the method 400 proceeds to step 418. However, if at step 410, the method 400 determines that the original e-mail from which the metadata was extracted no longer exists, meaning it has been deleted, the method 400 proceeds to step 416.

At step 416, the method 400 deletes the metadata from the repository. This prevents a user from attempting to access a document that no longer is available because the e-mail to which it was attached has been deleted. The method 400 proceeds to step 418, where the method 400 determines whether any additional metadata exists in the user repository.

If at step 418, the method 400 determines that more metadata exists, the method 400 proceeds to step 404 and iterates until all of the metadata has been accessed and the associated document evaluated, at which time the method 400 proceeds to step 420 and ends.

Figure 5:
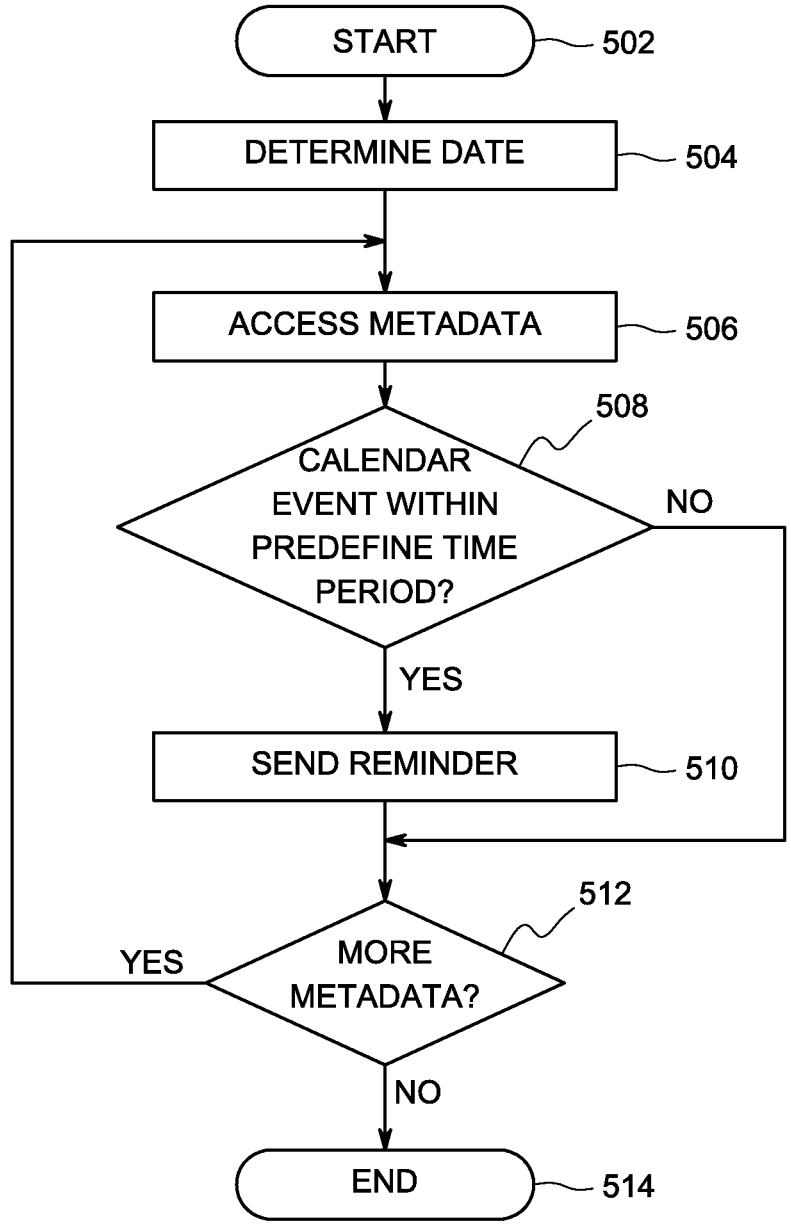
FIG. 5 depicts a flow diagram of a method for sending calendar reminders as performed by the notification module of FIG. 1, according to one or more embodiments.

FIG. 5 depicts a flow diagram of a method 500 for sending calendar reminders as performed by the notification module 136 of FIG. 1, according to one or more embodiments. The method 500 determines whether any calendar events are stored in metadata for any documents and sends a reminder e-mail to the user regarding the calendar event. The method 500 starts at step 502 and proceeds to step 504.

At step 504, the method 500 determines the date. The method 500 makes a call to the computer 104 to return the system date. The method 500 proceeds to step 506, where the method 500 access metadata in the repository. If the e-mail from which the metadata was extracted included a calendar event, such as a meeting or a due date, the calendar event was stored in the metadata. The method 500 proceeds to step 508.

At step 508, the method 500 determines whether a calendar event occurs within a predefined time period in the future, for example one week. If the method 500 determines that no calendar event exists or that the calendar event is outside of the predefined time period, the method 500 proceeds to step 512. However, if at step 508, the method 500 determines that a calendar event exists and is within the predefined time period, the method 500 proceeds to step 510.

At step 510, the method 500 sends a reminder e-mail to the user. The reminder e-mail includes the calendar event. The reminder e-mail may also include content from the original e-mail that discusses the calendar event, for example, "please review by Monday". In some embodiments, additional information regarding the document is retrieved from the metadata and sent in the reminder e-mail. In some embodiments, the document that is associated with the reminder is sent with the e-mail reminder. If the document is not yet stored in the repository, the document is retrieved from the e-mail server, stored in the repository, and sent in the reminder e-mail. The method 500 proceeds to step 512.

At step 512, the method 500 determines whether there is more metadata that may include calendar events. If the method 500 determines that more metadata exists, the method 500 proceeds to step 506 and iterates until all metadata has been evaluated for calendar events, at which time the method 500 proceeds to step 514 and ends.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for centrally aggregating and managing, within a cloud repository, e-mail attachments from various e-mail accounts, the method comprising:

accessing, by at least one server associated with the cloud repository, account information for one or more e-mail accounts belonging to a user and provided by one or more third-party e-mail providers that are independent of the cloud repository;

accessing, by the at least one server, the one or more e-mail accounts using the account information, wherein the one or more e-mail accounts include a plurality of e-mails that each have at least one attachment;

extracting, by the at least one server from the one or more e-mail accounts, metadata for each of the plurality of e-mails that each have at least one attachment, wherein the metadata comprises information that identifies an attachment and an associated e-mail;

storing, within the cloud repository, the extracted metadata in a user account for the user;

representing, within a graphical user interface for the cloud repository, each attachment of the plurality of e-mails as a document available within the user account;

receiving a user selection of an e-mail attachment from the graphical user interface;

determining whether the e-mail attachment is stored within the cloud repository;

if the e-mail attachment is not stored within the cloud repository, retrieving, in response to the user selection, the e-mail attachment from a third-party e-mail provider from which the e-mail attachment is available;

receiving one or more modifications of the e-mail attachment by the user;

accessing information for an e-mail to which the e-mail attachment was attached to identify a sender and one or more recipients of the e-mail; and sending, to the sender and the one or more recipients, a notification e-mail from an e-mail account associated with the user, the notification e-mail indicating that the e-mail attachment was modified in response to the received one or more modifications.

2. The method of claim 1, further comprising:
periodically synchronizing the user account in the cloud repository with the one or more e-mail accounts, wherein periodically synchronizing the user account comprises:
determining whether a second e-mail, for which extracted metadata is stored in the user account, has been deleted from a corresponding e-mail account; and
if the second e-mail has been deleted from the corresponding e-mail account, deleting the extracted metadata associated with the second e-mail from the user account in the cloud repository.

3. The method of claim 1, further comprising:
identifying, by the at least one server associated with the cloud repository, information associated with a calendar event from the extracted metadata; and
sending, by the at least one server associated with the cloud repository, a reminder for the calendar event to the user.

4. The method of claim 1, wherein the metadata for each of the plurality of e-mails comprises a document name, a document type for a document attached to the associated e-mail, a sender, a recipient, a subject line, a date, or content of the associated e-mail.

5. The method of claim 1, wherein retrieving the e-mail attachment further comprises accessing an e-mail account corresponding to the e-mail attachment and retrieving the e-mail attachment from the e-mail to which the e-mail attachment is attached.

6. The method of claim 1, wherein the one or more modifications of the e-mail attachment comprise one or more of a modification of content of the e-mail attachment, an acceptance of changes made by a previous user of the e-mail attachment, an addition of a comment to the e-mail attachment, or an addition of a recipient of the e-mail attachment.

7. The method of claim 1, wherein storing the extracted metadata in the user account for the user comprises storing the extracted metadata in a hierarchical structure including a folder for each user of the cloud repository, the method further comprising:
creating, within a main folder for the user, one or more sub-folders, wherein each sub-folder represents one of the one or more e-mail accounts; and
storing the extracted metadata in the created one or more sub-folders.

8. The method of claim 1, wherein the extracted metadata for the e-mail attachment is stored as a JavaScript Object Notation.

9. The method of claim 1, further comprising receiving preferences from the user for each of the one or more e-mail accounts, wherein the preferences comprise at least one of a specified maximum number of documents to store for an e-mail account or a specified period of time for storing documents for an e-mail account.

10. An apparatus for automatically aggregating metadata and e-mail attachments from various e-mail providers in a cloud repository, the apparatus comprising:
at least one server associated with the cloud repository;
one or more processors and at least one non-transitory computer readable medium storing instructions thereon that, when executed by the one or more processors, cause the apparatus to:
access account information for multiple e-mail accounts belonging to a user and provided by multiple third-party e-mail providers that are independent of the cloud repository;
access, from the multiple third-party e-mail providers, the multiple e-mail accounts using the account information, wherein the multiple e-mail accounts each include a plurality of e-mails that each have at least one document attached thereto;
extract, from the multiple e-mail accounts, metadata for each of the plurality of e-mails that each have at least one document attached thereto, wherein the metadata for each e-mail comprises information that identifies the e-mail and the at least one attachment;
store, within a central cloud repository, the extracted metadata in a user account for the user;
represent, within a graphical user interface for the cloud repository, each attachment of the plurality of e-mails as a document available within the user account, wherein at least one attachment represented in the graphical user interface is stored within the cloud repository, and at least one attachment represented in the graphical user interface is not stored within the cloud repository;
receive a user selection of an e-mail attachment from the graphical user interface;
retrieve, in response to the user selection and in response to determining the e-mail attachment is not stored within the cloud repository, the e-mail attachment from a third-party e-mail provider from which the e-mail attachment is available;
receive one or more modifications of the e-mail attachment by the user;
access information for an e-mail to which the e-mail attachment was attached to identify a sender and one or more recipients of the e-mail; and
send, to the sender and the one or more recipients, a notification e-mail from an e-mail account associated with the user, the notification e-mail indicating that the e-mail attachment was modified in response to the received one or more modifications.

11. The apparatus of claim 10, wherein the metadata for each of the plurality of e-mails comprises at least one of a document name, a document type, a sender of the e-mail, one or more recipients of the e-mail, a subject line of the e-mail, a date of the e-mail, or content of the e-mail.

12. The apparatus of claim 10, wherein storing the extracted metadata in the user account for the user comprises storing the extracted metadata in a hierarchical structure including a folder for each user of the cloud repository, and wherein the instructions, when executed by the one or more processors, further cause the apparatus to:
create, within a main folder for the user, one or more sub-folders, wherein each sub-folder represents one of the one or more e-mail accounts; and
store the extracted metadata in the created one or more sub-folders.

13. The apparatus of claim 10, wherein the instructions, when executed by the one or more processors, further cause the apparatus to:
receive preferences from the user for each of the one or more e-mail accounts, wherein the preferences comprise at least one of a specified maximum number of documents to store for an e-mail account or a specified period of time for storing documents for an e-mail account.

14. A non-transitory computer readable medium for storing computer instructions that, when executed by at least one processor, cause a computer system to automatically aggregate metadata and e-mail attachments from various e-mail providers in a cloud repository by performing steps comprising:

accessing account information for one or more e-mail accounts belonging to a user and provided by one or more third-party e-mail providers;

accessing a plurality of e-mails from the one or more e-mail accounts using the account information, wherein each of the plurality of e-mails comprise one or more attachments;

extracting, from the one or more e-mail accounts, metadata for each of the plurality of e-mails, wherein the metadata for each of the plurality of e-mails comprises information that identifies the e-mail and the one or more attachments;

storing, within the cloud repository, the extracted metadata in a user account for the user;

representing, within a graphical user interface for the cloud repository, each attachment of the plurality of e-mails as a document available within the user account;

receiving a user selection of an e-mail attachment from the graphical user interface;

determining whether the e-mail attachment is stored within the cloud repository;

if the e-mail attachment is not stored within the cloud repository, retrieving, in response to the user selection, the e-mail attachment from a third-party e-mail provider from which the e-mail attachment is available;

receiving one or more modifications of the e-mail attachment by the user;

accessing information for an e-mail to which the e-mail attachment was attached to identify a sender and one or more recipients of the e-mail; and sending, to the sender and the one or more recipients, a notification e-mail from an e-mail account associated with the user, the notification e-mail indicating that the e-mail attachment was modified in response to the received one or more modifications.

15. The non-transitory computer readable medium of claim 14, the steps further comprising:

in response to the user selection, providing access to sharing the e-mail attachment.

16. The non-transitory computer readable medium of claim 14, the steps further comprising:

periodically synchronizing the user account in the cloud repository with the one or more e-mail accounts, wherein periodically synchronizing the user account comprises:

determining whether a second e-mail, for which extracted metadata is stored in the user account, has been deleted from a corresponding e-mail account; and if the second e-mail has been deleted from the corresponding e-mail account, deleting the extracted metadata for the second e-mail from the user account in the cloud repository.

17. The non-transitory computer readable medium of claim 14, the steps further comprising:

identifying, within the stored metadata, information associated with a calendar event;

identifying, based on the stored metadata, one or more recipients of an e-mail associated with the calendar event; and sending a reminder e-mail for the calendar event to the one or more recipients of the e-mail associated with the calendar event.

18. The non-transitory computer readable medium of claim 14, wherein the account information comprises at least one of an e-mail identifier, a password, or information to access an e-mail server associated with an e-mail account.

19. The non-transitory computer readable medium of claim 14, wherein the metadata for each of the plurality of e-mails comprises at least one of a document name, a document type, a sender of the e-mail, one or more recipients of the e-mail, a subject line of the e-mail, a date of the e-mail, or content of the e-mail.

20. The computer readable medium of claim 14, wherein storing the extracted metadata in the user account for the user comprises storing the extracted metadata in a hierarchical structure including a folder for each user of the cloud repository, the steps further comprising:

creating, within a main folder for the user, one or more sub-folders, wherein each sub-folder represents one of the one or more e-mail accounts; and storing the extracted metadata in the created one or more sub-folders.

* * * * *